No. 705,933. Patented July 29, 1902.
J. E. KEYT.
TRAP FLUSH.
(Application filed July 5, 1901.)
(No Model.)

WITNESSES:
K. Lockwood Nevins,
M. J. Begley.

INVENTOR.
John E. Keyt
BY
Francis M. Wright,
ATTORNEY.

UNITED STATES PATENT OFFICE.

JOHN E. KEYT, OF SAN FRANCISCO, CALIFORNIA, ASSIGNOR OF ONE-HALF TO J. RAYMOND SMITH, OF SAN FRANCISCO, CALIFORNIA.

TRAP-FLUSH.

SPECIFICATION forming part of Letters Patent No. 705,933, dated July 29, 1902.

Application filed July 5, 1901. Serial No. 67,236. (No model.)

*To all whom it may concern:*

Be it known that I, JOHN E. KEYT, a citizen of the United States, residing at San Francisco, in the county of San Francisco and State of California, have invented certain new and useful Improvements in Trap-Flushes, of which the following is a specification.

My invention relates to an improved device for flushing traps such as are used in drain-pipes from kitchen-sinks and other receptacles.

It is frequently the case that traps in drain-pipes become so clogged up with refuse matter carried down with the water that it is impossible to flush the same from the top through the drain-pipe. When this is the case, it is necessary to open a vent provided for this purpose at the bottom of the trap, and thus permit the refuse matter to be discharged therefrom. Great difficulty is often experienced in opening such vents, and, moreover, the operation is a dirty and disagreeable one.

The object of my invention is to provide an improved arrangement by means of which the trap can be readily flushed and emptied of any refuse matter accumulated therein and clogging up the same.

My invention therefore resides in the novel construction, combination, and arrangement of parts for the above ends hereinafter fully specified, and particularly pointed out in the claim.

Figure 1:
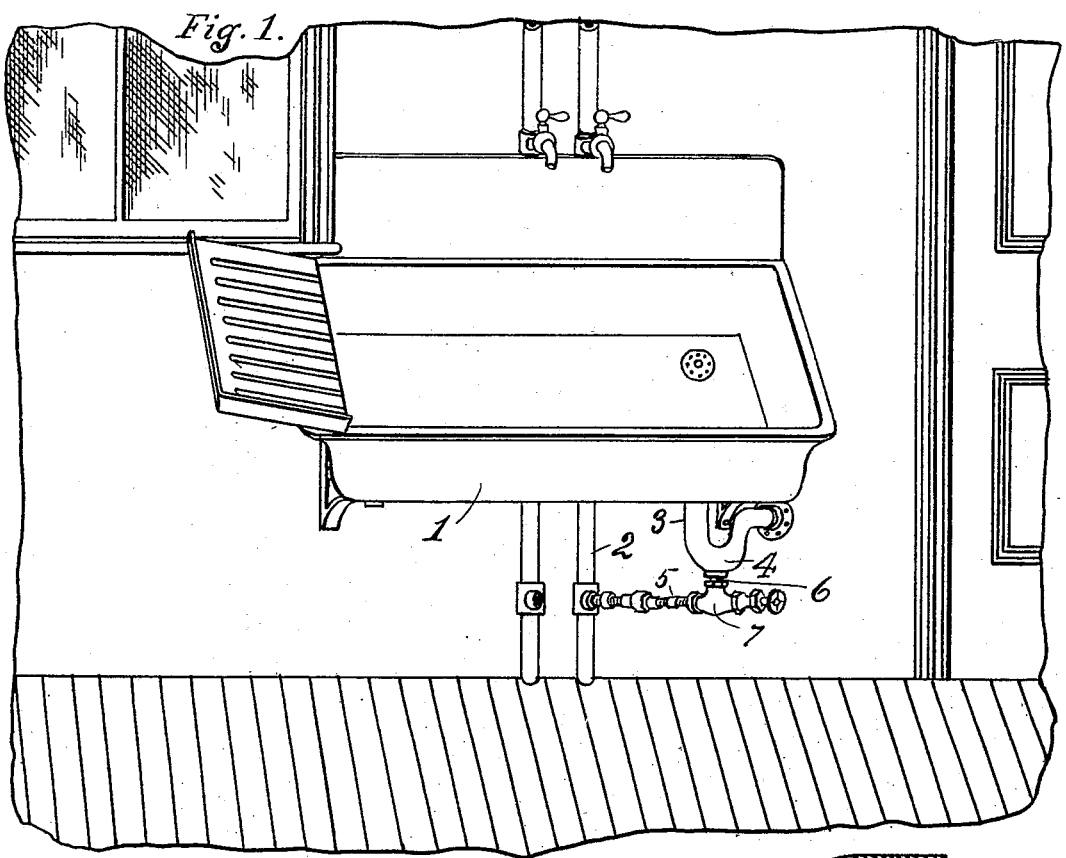
Figure 2:
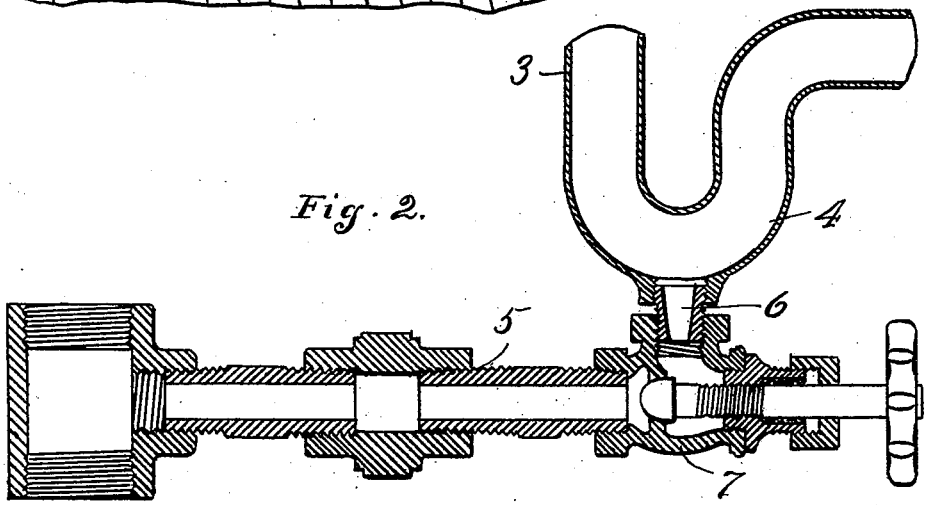

In the accompanying drawings, Figure 1 is a perspective view showing a sink and trap to which my improved device is applied, and Fig. 2 is a longitudinal section of the connection between the main water-supply pipe and the trap.

Referring to the drawings, 1 represents a sink, and 2 the cold-water-supply pipe leading thereto. 3 represents the drain-pipe, and 4 a trap therein, all of the usual construction. From the supply-pipe 2 to the trap 4 leads a conduit 5, having a short connection 6 opening into the bottom of the trap. An angle-valve 7 is provided for normally closing said conduit. The connection 6 is preferably made to flare or diverge upwardly, as shown, the more readily to discharge and force the refuse matter up out of the trap.

It will be understood that my improved construction may be applied to all cases where the trap in the drain-pipe is in proximity to a water-supply pipe conveying water under pressure; also, that the point of entrance of the conduit into the trap and the form of said conduit may be varied without departing from the spirit of my invention.

I claim—

The combination of a drain-pipe having a U end therein to form a trap and having an aperture in the lowest part of said U end, a supply-pipe, a conduit leading from the supply-pipe to a point below said trap, a valve in said conduit, and a removable connection between the conduit and said aperture, said connection being open at both ends and having a conical inner surface, the smaller open end being connected with the conduit and the larger open end being connected with the aperture for the trap, substantially as described.

In witness whereof I have hereunto set my hand in the presence of two subscribing witnesses.

J. E. KEYT.

Witnesses:
J. RAYMOND SMITH,
FRANCIS M. WRIGHT.